(12) United States Patent
Kim

(10) Patent No.: US 8,357,729 B2
(45) Date of Patent: Jan. 22, 2013

(54) CONDUCTIVE TONER SUPPLY ROLLER, METHOD OF MANUFACTURING SUPPLY ROLLER, AND ELECTROSTATIC RECORDING APPARATUS HAVING THE SUPPLY ROLLER

(75) Inventor: Tae-hyun Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1312 days.

(21) Appl. No.: 11/943,717

(22) Filed: Nov. 21, 2007

(65) Prior Publication Data

US 2009/0012196 A1 Jan. 8, 2009

(30) Foreign Application Priority Data

Jul. 2, 2007 (KR) ........................ 10-2007-0066248

(51) Int. Cl.
*C08G 18/00* (2006.01)
*G03G 15/08* (2006.01)

(52) U.S. Cl. ........ 521/170; 521/172; 521/174; 399/279; 399/291

(58) Field of Classification Search ................... 399/279, 399/281; 521/170, 172, 174
See application file for complete search history.

(56) References Cited

U.S. PATENT DOCUMENTS

| 6,393,243 | B1 * | 5/2002 | Satoh et al. .................... 399/286 |
| 6,524,760 | B1 * | 2/2003 | Ikeuchi et al. ............ 430/124.51 |
| 6,776,745 | B2 | 8/2004 | Nakashima et al. |
| 2003/0153444 | A1 * | 8/2003 | Nakashima et al. ............ 492/56 |
| 2005/0220502 | A1 * | 10/2005 | Kim ............................ 399/286 |
| 2006/0130330 | A1 * | 6/2006 | Kim .......................... 29/895.21 |

FOREIGN PATENT DOCUMENTS

| CN | 1434354 | | 8/2003 |
| KR | 2006055669 A | * | 5/2006 |

OTHER PUBLICATIONS

Machine Translation of KR 2006055669 A, 2011.*
Chinese Office Action issued Jun. 30, 2011 in CN Application No. 200810095956.9.

* cited by examiner

*Primary Examiner* — Liam Heincer
(74) *Attorney, Agent, or Firm* — Stanzione & Kim, LLP

(57) ABSTRACT

A conductive toner supply roller and a method of manufacturing the supply roller. The method includes preparing a polyurethane foam, impregnating the polyurethane foam with an impregnation solution including an electroconductive polymer, a binder resin, an electroconductive agent and a solvent, and drying the resulting polyurethane foam, cutting the dried polyurethane foam, and inserting a shaft into the cut polyurethane foam, and polishing an outer surface of the resulting polyurethane foam. The resulting conductive toner supply roller has a low or medium resistance, and may be user in an electrostatic recording apparatus such as a printer, a facsimile machine, a copier or the like.

21 Claims, 1 Drawing Sheet

CONDUCTIVE TONER SUPPLY ROLLER, METHOD OF MANUFACTURING SUPPLY ROLLER, AND ELECTROSTATIC RECORDING APPARATUS HAVING THE SUPPLY ROLLER

CROSS-REFERENCE TO RELATED APPLICATIONS

This application claims priority under 35 U.S.C. §119 (a) of Korean Patent Application No. 10-2007-0066248, filed on Jul. 2, 2007, in the Korean Intellectual Property Office, the disclosure of which is incorporated herein by reference in its entirety.

BACKGROUND OF THE INVENTION

1. Field of the Invention

The present general inventive concept relates to a conductive toner supply roller and a method of manufacturing the supply roller. More particularly, the present general inventive concept relates to a method of manufacturing a conductive toner supply roller by impregnating a polyurethane foam with a conductive impregnation solution and drying the polyurethane foam, so that a conductive polyurethane foam toner supply roller of low to medium resistance may be manufactured and may be used in an electrostatic recording apparatus such as a printer, a facsimile machine, a copier or the like.

2. Description of the Related Art

Electrostatic image forming apparatuses, such as laser printers, facsimile machines, and copiers, are provided with conductive toner supply rollers. FIG. 1 illustrates the structure of a conventional laser printer 10 as an example of an image forming apparatus.

Referring to FIG. 1, a charger 11 of the laser printer 10 electrifies a photosensitive medium 12. An electrostatic latent image is formed on a surface of the photosensitive medium 12 by a light projected by a laser scanning unit 13. The electrostatic latent image is developed by a developing roller 14 into a toner image using toner T supplied by a toner supply roller 15. The toner image is transferred onto a paper P by a transfer roller 16 and then fixed by an image fixing device 17. The toner supply roller 15 is an essential part of a developing device, as it supplies the toner T to the developing roller 14 and recovers remaining toner not used for the development of the electrostatic latent image by the developing roller 14. The toner supply roller 15 keeps the toner at a constant charge per mass (Q/M) in association with the developing roller 14 or a control blade 18.

FIG. 2 illustrates the toner supply roller 15 of the laser printer 10 of FIG. 1. In FIG. 2, the toner supply roller 15 includes a shaft 15a and a resilient member 15b enclosing an outer circumference of the shaft 15a. The resilient member 15b of the toner supply roller 15 is usually made of a polyurethane foam or a silicone foam. The polyurethane foam has a lower hardness than the silicon foam. Since the polyurethane foam has relatively low hardness and low toner stress and accordingly improves a lifespan of the toner supply roller 15, it is suitable for use in a high-speed image forming apparatus. The toner supply roller 15 including the resilient member 15b made of the polyurethane foam is capable of controlling the toner supply and toner electrification according to the raw material of the polyurethane, cell size, hardness, percentage of closed cells, and density of the polyurethane foam.

Conventionally, an ionic conductive agent or an electroconductive agent is added to the foam, to electrify the polyurethane foam constituting the resilient member 15b of the toner supply roller 15. However, since a blowing agent may become sticky or collapse when the ionic conductive agent is used in large quantities, for example when an amount of 10 parts per hundred rubber (phr) or greater is used, the ionic conductive agent should be added in a small amount. Accordingly, it is difficult to provide a polyurethane foam having a resistance of a medium or low degree (for example, 1.0E+08 or less) to the blowing agent. Such an ionic conductive type is used with a resistance equal to or greater than 1.0E+08. An electroconductive type agent means that a carbon black is added together with polyol and isocyanate. However, when a carbon black having a small average particle diameter and a high resistance is added, the polyurethane foam gets sticky. Therefore, formation of the blowing agent becomes difficult, and it is hard to make a cell arrangement even.

Moreover, in a case of impregnating the polyurethane foam with an impregnation solution containing a carbon black, a binder resin and a solvent to electrify the polyurethane foam, it is difficult to implement a polyurethane foam having a low or medium resistance (1.0E+05 to 1.0E+07). The polyurethane foam has a low resistance, that is, a resistance less than or equal to approximately 1.0E+05, thereby causing current to leak, an inferior supply of toner and a decrease in the density.

SUMMARY OF THE INVENTION

The present general inventive concept provides a method of manufacturing a conductive toner supply roller, in which a polyurethane foam is impregnated with a conductive impregnation solution containing an electroconductive polymer, an electroconductive agent, a binder resin and a solvent, and the resulting polyurethane foam is then dried so that the polyurethane foam may be electrified.

The present general inventive concept also provides a conductive toner supply roller provided according to the method described above. The manufactured supply roller may have a low or medium resistance, which is not realized by conventional methods of adding an ionic conductive agent or of impregnating a conductive carbon black.

The present general inventive concept also provides a toner supply roller which is used in an electrostatic recording apparatus such as a printer, a facsimile machine, a copier or the like.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of manufacturing a conductive toner supply roller, the method including preparing a polyurethane foam; impregnating the polyurethane foam with an impregnation solution including an electroconductive polymer, a binder resin, an electroconductive agent and a solvent, and drying the resulting polyurethane foam; cutting the dried polyurethane foam, and inserting a shaft into the cut polyurethane foam; and polishing an outer surface of the resulting polyurethane foam.

The polyurethane foam may be prepared by mixing a compound having at least two active hydrogen atoms and a compound having at least two isocyanate groups in the presence of a catalyst, a blowing agent and a surfactant, and by foaming the mixture. The polyurethane foam may be prepared in the additional presence of a reactive conducting agent.

The compound having at least two active hydrogen atoms may be selected from the group consisting of a polyether polyol, a polyester polyol, and a polyetherester polyol having a terminal hydroxyl group on its end, an acryl-modified polyol and a silicone-modified polyol.

The compound having at least two isocyanate groups may include polyisocyanate. The compound having at least two isocyanate groups may include toluene diisocyanate (TDI), or may include 4,4-diphenylmethane diisocyanate (MDI).

The catalyst may include a tertiary amine.

The blowing agent may include water, or may include trichlorofluoromethane.

The surfactant may include a silicone surfactant.

The electroconductive polymer of the impregnation solution may be selected from the group consisting of polyacetylene, poly(p-phenylene), polythiophene, poly(ethylenedioxythiophene), polypyrrole, poly(p-phenylenevinylene), poly(thienylvinylene), polyaniline, polyisothianaphthen and poly(p-phenylenesulfide), and may be added in an amount in the range of from approximately 0.3 phr to approximately 10 phr based on an amount of the impregnation solution.

The electroconductive polymer may include polythiophene.

The binder resin may be at least one compound selected from the group consisting of an acrylic resin, a polyacrylic acid ester resin, an acrylic acid-styrene copolymer, a polyvinyl alcohol, a polyacrylamide, a polyvinylchloride resin, a polyurethane resin, a vinyl acetate resin, a butadiene resin, an epoxy resin, an alkyd resin, a melamine resin and a chloroprene resin, and may be added in an amount in a range of from approximately 5 to approximately 30 phr based on an amount of the impregnation solution.

The binder resin may include an acrylic resin.

The electroconductive agent may be a compound selected from the group consisting of conductive carbon blacks, oxidation-treated carbon ink, thermal carbon, natural graphite, artificial graphite, conductive metallic oxides and metals, and may be added in an amount in a range of from approximately 3 to approximately 20 phr based on the amount of the impregnation solution.

The electroconductive agent may be a conductive carbon black. Ketjen black EC, Ketjen black 300J, Ketjen black 600J, Balkan XC, Balkan CSX, an acetylene black, such as Denka black, and conductive furnace black may be used as the conductive carbon black.

The solvent may include water, alcohol or ether.

The foregoing and/or other aspects and utilities of the present general inventive concept may also be achieved by providing a conductive toner supply roller, which is manufactured by impregnating a polyurethane foam with an impregnation solution including an electroconductive polymer, a binder resin, an electroconductive agent and a solvent, and drying the polyurethane foam. The polyurethane foam may have a resistance of from approximately 1.0E+05 to approximately 9.0E+07 and a hardness of from approximately 40 to approximately 80 (ASKER F type).

The foregoing and/or other aspects and utilities of the present general inventive concept may also be achieved by providing an electrostatic recording apparatus including a conductive toner supply roller manufactured by impregnating a polyurethane foam with an impregnation solution including an electroconductive polymer, a binder resin, an electroconductive agent and a solvent, and drying the polyurethane foam, where the polyurethane foam may have a resistance of from approximately 1.0E+05 to approximately 9.0E+07 and a hardness of from approximately 40 to approximately 80 (ASKER F type).

The electrostatic recording apparatus may be a printer, a facsimile machine or a copier.

The foregoing and/or other aspects and utilities of the present general inventive concept may also be achieved by providing a method of manufacturing a conductive toner supply roller including preparing a polyurethane foam, impregnating the prepared polyurethane foam with an impregnation solution including polythiophene, an acrylic resin, an electroconductive agent and a solvent, drying and applying pressure to the impregnated polyurethane foam, and inserting a heated shaft into the dried and pressured polyurethane foam.

The foregoing and/or other aspects and utilities of the present general inventive concept may also be achieved by providing a method of manufacturing a conductive polyurethane foam, including mixing a blowing agent, a surfactant, a catalyst, a polyol compound and toluene diisocyanate (TDI), agitating the mixture at about 2,000 rpm at room temperature to form a slab, impregnating the slab with an impregnation solution including a binder resin, a solvent an electroconductive carbon black and an electroconductive polymer, and pressing and drying the impregnated slab.

The foregoing and/or other aspects and utilities of the present general inventive concept may also be achieved by providing an electroconductive toner supply roller of an image forming device manufactured by a method including preparing a polyurethane foam by mixing a compound having at least two active hydrogen atoms and a compound having at least two isocyanate groups in the presence of a catalyst, a blowing agent and a surfactant, and by foaming the mixture, impregnating the prepared polyurethane foam with an impregnation solution including an electroconductive polymer, a binder resin, an electroconductive agent and a solvent, drying and pressing the impregnated polyurethane foam, and inserting a shaft into the dried and pressed polyurethane foam.

The compound having at least two isocyanate groups may be polyisocyanate.

The foregoing and/or other aspects and utilities of the present general inventive concept may also be achieved by providing an electroconductive toner supply roller of an image forming device manufactured by a method, including mixing a blowing agent, a surfactant, a catalyst, a polyol compound and toluene diisocyanate (TDI) to form a slab, impregnating the slab with an impregnation solution including a binder resin, a solvent an electroconductive agent, and an electroconductive polymer, applying pressure to and drying the impregnated slab, and inserting a shaft into the pressured and dried impregnated slab.

BRIEF DESCRIPTION OF THE DRAWINGS

These and/or other aspects and utilities of the present general inventive concept will be more readily appreciated from the following description of the embodiments, taken in conjunction with the accompanying drawings, of which.

DETAILED DESCRIPTION OF THE PREFERRED EMBODIMENTS

Figure 1:
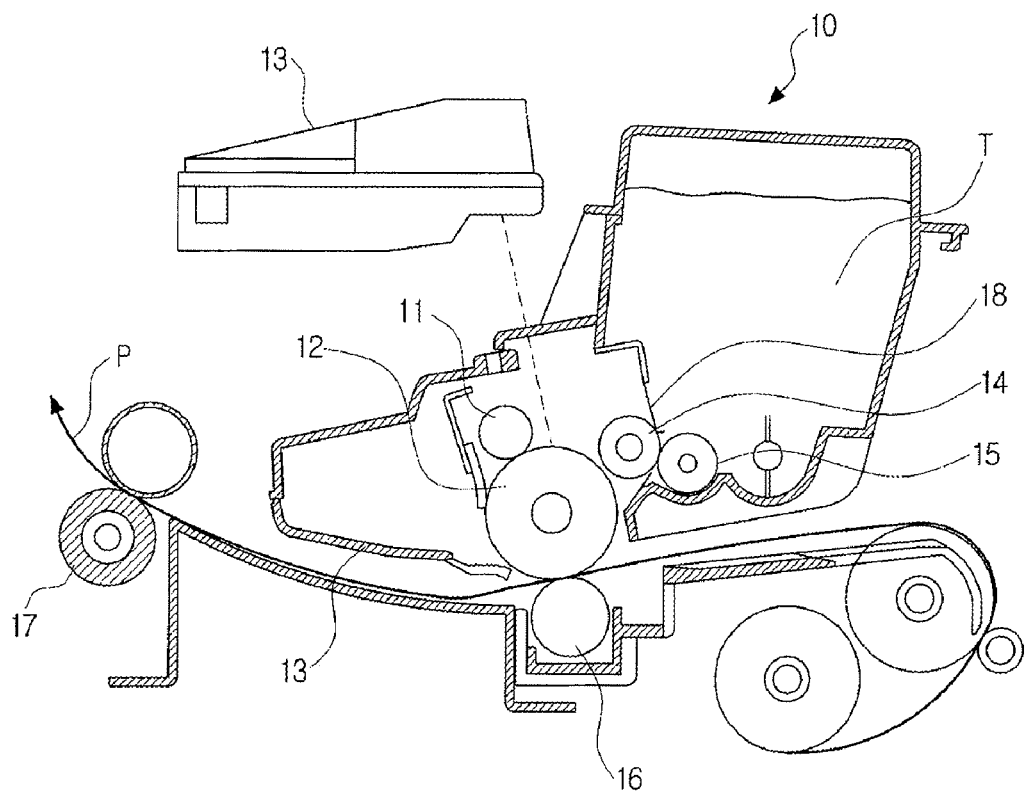
FIG. 1 is a view illustrating a structure of a conventional image forming apparatus.
Figure 2:
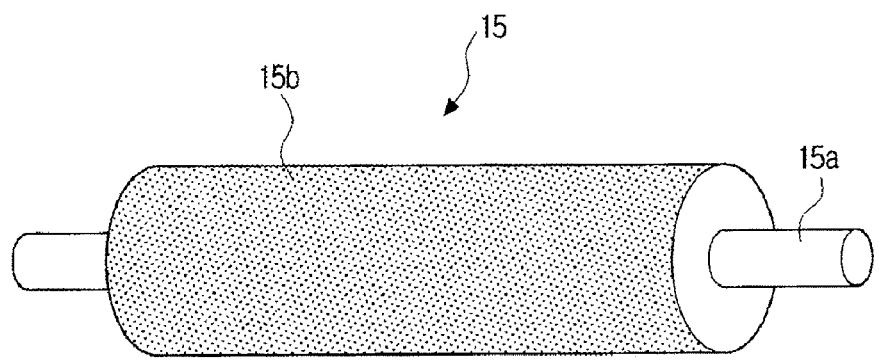
FIG. 2 is a perspective view of a toner supply roller of the conventional image forming apparatus of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

In order to manufacture a conductive toner supply roller, a continuous or semi-continuous open polyurethane foam is prepared in advance. The polyurethane foam previously prepared is impregnated with an impregnation solution containing an electroconductive polymer, an electroconductive agent, a binder resin and a solvent, and the impregnated polyurethane foam is then dried. Next, the dried polyurethane foam is cut into blocks using a vertical cutter, a hole is formed in the center in a length direction of each of the blocks, and a shaft is pressingly inserted into the hole. Finally, an outer surface of the polyurethane foam is polished to manufacture a conductive toner supply roller.

A polyurethane foam usable in the exemplary embodiment of the present general inventive concept may be manufactured using well-known methods. In more detail, a compound having at least two active hydrogen atoms and a compound having at least two isocyanate groups are added to additives including a catalyst, a blowing agent, a surfactant and a reactive conducting agent. The resulting reaction mixture is stirred and mixed to form a foam and the resulting foam is cured, and accordingly, a polyurethane foam can be manufactured.

The compound having at least two active hydrogen atoms may be polyol, which is generally used as a raw material of a polyurethane foam. Examples of suitable polyols include a polyether polyol, a polyester polyol, and a polyetherester polyol having a terminal hydroxyl group on its end, and a modified polyol such as an acryl-modified polyol or a silicone-modified polyol, but are not limited thereto.

The compound having at least two isocyanate groups may be polyisocyanate, which is generally used as a raw material to produce polyurethane foams. Examples of suitable polyisocyanate include, but are not limited to, toluene diisocyanate (TDI), 4,4-diphenylmethane diisocyanate (MDI), or a mixture or a modified form thereof.

The catalyst used in the preparation of the polyurethane foam is selected and the amount thereof is adjusted to improve the blowing properties, reduce the reaction time, improve the air permeability of a foam, and minimize the density difference. Examples of catalysts that satisfy these requirements include, but are not limited to, an organometallic compound containing tin, lead, iron, and titanium, and amine-based compounds, or a mixture thereof. Tertiary amines or tin-based catalyst may also be used.

The blowing agent may be a material with a low boiling point, such as water or halogenated alkane, for example, trichlorofluoromethane. Water may be used as the blowing agent in this exemplary embodiment.

The surfactant used in the preparation of the polyurethane foam reduces the surface tension to improve miscibility, makes the size of the generated cells uniform, and adjusts the cell structure of the foam to stabilize the blowing agent. A silicone surfactant may be used in this exemplary embodiment of the present general inventive concept. The surfactant may be added in an amount in the range of from approximately 0.1 phr to approximately 5 phr. When the amount of the surfactant is equal to or less than 0.1 phr, the proper functioning of the surfactant cannot be guaranteed, and when the amount of the surfactant is equal to or higher than 5 phr, properties such as its compression set may be reduced.

In the exemplary embodiments of the present general inventive concept, a conductive toner supply roller can be manufactured by impregnating a polyurethane foam with a conductive impregnation solution containing an electroconductive polymer, a binder resin, an electroconductive agent and a solvent, and driving the impregnated polyurethane foam.

The electroconductive polymer of the impregnation solution may be at least one compound selected from the group consisting of polyacetylene, poly (p-phenylene), polythiophene, poly (ethylenedioxythiophene), polypyrrole, poly (p-phenylenevinylene), poly (thienylvinylene), polyaniline, polyisothianaphthen and poly (p-phenylenesulfide). In this exemplary embodiment, polythiophene may be used. The electroconductive polymer may be added in an amount in the range of from approximately 0.3 phr to approximately 10 phr. When the amount of the electroconductive polymer is equal to or less than 0.3 phr, it is difficult for the polyurethane foam to have the desired low or medium resistance, and when the amount of the electroconductive polymer is equal to or higher than 10 phr, costs may increase.

Polyaniline may be represented by the following Formula I.

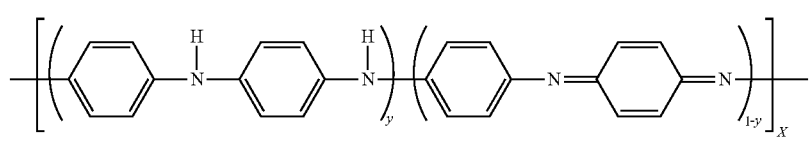

[Formula I]

Polypyrrole may be represented by the following Formula II.

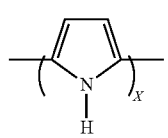

[Formula II]

Polythiophene may be represented by the following Formula III.

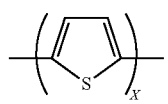

[Formula III]

The binder resin contained in the impregnation solution may be at least one compound selected from the group consisting of an acrylic resin, a polyacrylic acid ester resin, an acrylic acid-styrene copolymer, a polyvinyl alcohol, a polyacrylamide, a polyvinylchloride resin, a polyurethane resin, a vinyl acetate resin, a butadiene resin, an epoxy resin, an alkyd resin, a melamine resin, and a chloroprene resin. An acrylic resin may be used as a binder resin in this exemplary embodiment.

The binder resin may be added in an amount in a range of from approximately 5 to approximately 30 phr based on an amount of the impregnation solution. When the amount of the binder resin is equal to or less than approximately 5 phr, adhesion of the electroconductive carbon black to cells of the polyurethane foam is insufficient. When the binder resin is equal to or greater than approximately 30 phr, a recovery force of the polyurethane foam is reduced.

The electroconductive agent may include conductive carbon blacks (such as super abrasion furnace (SAF) black, intermediate super abrasion furnace (ISAF) black, high abrasion furnace (HAF) black, fast extrusion furnace (FEF) black, general purposes furnace (GPF) black, semi-reinforcing furnace (SRF) black, fine thermal (FT) black, and medium thermal (MT), Ketjen black, and acetylene black), oxidation-treated carbon ink, thermal carbon, natural graphite, artificial graphite, conductive metallic oxides (such as tin oxide, titanium oxide, and zinc oxide), and metals (such as silver, nickel, copper, and germanium).

In this exemplary embodiment, when the conductive carbon black is used as the electroconductive agent, conductive carbon blacks having a small average particle diameter and a large surface area can be used. For example, Ketjen black EC, Ketjen black 300J, Ketjen black 600J, Balkan XC, Balkan CSX, the acetylene black, such as Denka black, and conductive furnace black may be used as the conductive carbon black having the small average particle diameter and the large surface area. An amount of the electroconductive agent can be, for example, from approximately 3 to approximately 20 phr. When the amount of the electroconductive agent is less than approximately 3 phr, conductivity is not sufficient. When the amount of the electroconductive agent is greater than approximately 20 phr, too many carbon black particles adhere to the polyurethane foam so that the carbon black particles are detached from the foam, or mechanical properties of the foam, such as the resilience of the foam, may be reduced.

The solvent of the impregnation solution may be, but is not limited to, water, alcohol or ether.

The previously prepared polyurethane foam is impregnated with the impregnation solution described above, and is then dried by, for example, hot air drying. According to the conventional method, the resulting polyurethane foam is then cut, and the shaft is pressingly inserted into a hole generated by cutting. An outer surface of the polyurethane foam is polished, so that a toner supply roller can be manufactured.

The toner supply roller has a resistance of from approximately 1.0E+05 to approximately 9.0E+07 and a hardness of from approximately 40 to approximately 80 (ASKER F type), which is realized as a conductive toner supply roller of an electrostatic recording apparatus such as a printer, a copier and a facsimile machine.

The present general inventive concept will now be described in greater detail with reference to the following examples. The following examples are for illustrative purposes only, and are not intended to limit the scope of the invention.

Example 1

A conductive polyurethane foam was manufactured as follows. A blowing agent, a surfactant and a catalyst were added to a polyol to prepare a premix polyol (referring to Table 1, below). TDI as a polyisocyanate was added to the premix polyol, and the premix polyol, including the TDI, was agitated at 2000 rpm to form a slab foam at room temperature. The formed slab foam was impregnated with an impregnation solution containing a binder resin, a solvent, an electroconductive carbon black and an electroconductive polymer. The impregnated slab foam was put in a roller, processed by squeezing, and dried by a forced air convection oven at approximately 130° C. for about 10 minutes, followed by removing the solvent. The dried polyurethane foam was cut using a vertical cutter into blocks having dimensions of 25×25×250 mm, and a hole having a diameter of 5.0 mm was formed in the center in a length direction of each of the blocks. A metal shaft having a diameter of 6.0 mm, wound with a hot melt sheet, was pressingly inserted into the hole. The foam and the shaft were attached to each other through the forced air convection oven at approximately 120° C. for about 30 minutes. The outer surface of the adhered polyurethane foam was polished by a polisher, and both ends of the foam were then cut. As a result, a conductive polyurethane foam toner supply roller having an outer diameter of 13.7 mm and a length of 220 mm, was manufactured.

The resistance, compression set, high temperature/high humidity test and image test of the polyurethane foam toner supply roller prepared as described above were measured. A sample was prepared following the above-described processes and using the components and mixing ratio described below in Table 2. The results of the evaluation are illustrated in Table 3.

TABLE 1

<Mixing ratio of polyurethane foam>

| Raw materials | Quantity (phr) |
|---|---|
| GP-3000 | 80 |
| KE-848 | 20 |
| TDI | 105 |
| Stannous octoate (Catalyst) | 0.3 |
| Triethylamine (Catalyst) | 0.2 |
| Silicone (Surfactant) | 1.5 |
| Water (Blowing agent) | 4.0 |
| Ammonium salt (Ionic conductive agent) | 10 |

GP-3000: polyester polyol, manufactured by KOREA POLYOL Co., Ltd., containing 54 mgKOH/g of hydroxy KE-848: AN copolymer polyol, containing 20% polyol of AN, manufactured by KOREA POLYOL Co., Ltd, containing 30 mgKOH/g of hydroxy

TABLE 2

<Conductive impregnation solution>

| Raw materials | Comp. Ex. 1 | Comp. Ex. 2 | Ex. 1 | Ex. 2 | Comp. Ex. 3 |
|---|---|---|---|---|---|
| Water | 90 | 90 | 90 | 90 | 90 |
| Ethanol | 10 | 5 | 5 | 5 | 5 |
| 600 J | 5 | 5 | 5 | 5 | 5 |
| Acrylic resin | 10 | 10 | 10 | 10 | 10 |
| Urethane resin | 10 | 10 | 10 | 10 | 10 |
| Acetate resin | 10 | 10 | 10 | 10 | 10 |
| Polythiophene | 0 | 12 | 5 | 2 | 0.1 |

600 J: Ketjen black, manufactured by Lion Akzo K. K., Japan

TABLE 3

<Test for conductive polyurethane foam toner supply roller>

|  | Comp. Ex. 1 | Comp. Ex. 2 | Ex. 1 | Ex. 2 | Comp. Ex. 3 |
|---|---|---|---|---|---|
| Resistance (Ω) | 2.0E+04 | 1.0E+06 | 7.0E+06 | 1.0E+07 | 5.0E+09 |
| Compression set (%) | 8 | 15 | 8 | 6 | 5 |
| High temperature/ High humidity | GOOD | POOR | GOOD | GOOD | GOOD |

In Comparative Example 2, excessive electroconductive polymer was added, and accordingly the polyurethane foam had a low elasticity. Therefore, inferior evaluation results were obtained in the compression set and the high temperature/high humidity tests. In Comparative Example 3, a very small amount of the electroconductive polymer was added to provide a high resistance. In contrast, both the toner supply rollers manufactured in Examples 1 and 2 exhibited excellent evaluation results.

Resistance was measured as follows. The polyurethane foam toner supply roller to be measured was mounted to a JIG, and conductive shafts of 200 g were put on each end of the roller, −500 V of direct current (DC) voltage was applied to the roller shaft, and the roller was rotated at a certain speed (for example, 30 rpm) to measure an electric current. The measured current was converted into a resistance value using the following equation.

Resistance($R$)=Voltage($V$)/Current($I$)

The compression set was measured as follows. A sample was compressed to 50% and left at 70° C. for 22 hours, and then the thickness of the sample was measured on JIS K6382, with a specification of 10% or less. The following equation was used to calculate the compression set percentage (%)

Compression set (%)=(thickness of sample before test−thickness of sample after test)/thickness of sample before test A high temperature/high humidity test was measured as follows. A supply roller was mounted in a developing device at room temperature and humidity, and an initial image was obtained and put into a black polyethylene bag, followed by heat fusing and sealing processes. The sealed material was left at a temperature of 40° C. and a humidity of 90% for two days, at a temperature of 50° C. and a humidity of 80% for two days and at a temperature of 40° C. and a humidity of 90% for two days, in sequence. Next, the resultant material was left for one day again at room temperature and humidity, and was then mounted in a set having a pattern of 2×2 to continuously print 30 sheets of paper. The images before and after being left at room temperature and humidity were compared to determine whether the images were printed normally.

TABLE 4

<Image test for conductive polyurethane foam toner supply roller>

|  | Comp. Ex. 1 | Comp. Ex. 2 | Ex. 1 | Ex. 2 | Comp. Ex. 3 |
|---|---|---|---|---|---|
| Solid Density (Toner supply property) | X | ○ | ○ | ○ | X |
| Rear end dragging | X | ○ | ○ | ○ | Δ |
| Difference in SR periodic density | ○ | X | ○ | ○ | ○ |

Image test results are illustrated above in Table 4, where the results were recorded using the symbol "○" to represent "Excellent" results, the symbol "Δ" to represent "Acceptable" results, and the symbol "×" to represent "Poor" results.

Referring to Tables 3 and 4, in Comparative Example 1, current leaked from the supply roller due to the supply roller having a very low resistance, so the inferior toner charge property evaluation result was exhibited. Additionally, inferior toner charge property and poor toner supply property caused poor evaluation results in the toner supply property and the rear end dragging test. The supply roller manufactured in Comparative Example 2 exhibited a poor difference in SR periodic density evaluation result due to insufficient elasticity. In Comparative Example 3, the high resistance caused the toner supply property to be reduced to a poor evaluation result. In contrast, both the toner supply rollers manufactured in Examples 1 and 2 in accordance with methods of the present general inventive concept exhibited excellent evaluation results.

TABLE 5

<Conductive impregnation solution>

| Raw materials | Comp. Ex. 4 | Comp. Ex. 5 | Ex. 3 | Ex. 4 | Comp. Ex. 6 |
|---|---|---|---|---|---|
| Water | 100 | 100 | 100 | 100 | 100 |
| Ethanol | 5 | 5 | 5 | 5 | 5 |
| 600 J | 10 | 5 | 5 | 5 | 5 |
| Acrylic resin | 8 | 8 | 8 | 8 | 8 |
| Urethane resin | 9 | 9 | 9 | 9 | 9 |
| Acetate resin | 10 | 10 | 10 | 10 | 10 |
| Polythiophene | 0 | 10 | 4 | 2 | 0.1 |

600 J: Ketjen black, manufactured by Lion Akzo K. K., Japan

TABLE 6

<Test for conductive polyurethane foam toner supply roller>

|  | Comp. Ex. 4 | Comp. Ex. 5 | Ex. 3 | Ex. 4 | Comp. Ex. 6 |
|---|---|---|---|---|---|
| Resistance (Ω) | 5.0E+04 | 7.0E+05 | 5.0E+06 | 7.0E+06 | 2.0E+09 |
| Compression set (%) | 8 | 13 | 7 | 5 | 5 |
| High temperature/ High humidity | GOOD | POOR | GOOD | GOOD | GOOD |

Referring to Tables 5-7, in Comparative Example 5, excessive electroconductive polymer was added, and accordingly the polyurethane foam had a low elasticity. Therefore, inferior evaluation results were obtained in the compression set and the high temperature/high humidity tests. In Comparative Example 6, a very small amount of the electroconductive polymer was added to provide a high resistance. In contrast, both the toner supply rollers manufactured in accordance with methods of the present general inventive concept in Examples 3 and 4 exhibited excellent evaluation results.

TABLE 7

<Image test for conductive polyurethane foam toner supply roller>

|  | Comp. Ex. 4 | Comp. Ex. 5 | Ex. 3 | Ex. 4 | Comp. Ex. 6 |
|---|---|---|---|---|---|
| Solid Density (Toner supply property) | X | ○ | ○ | Δ | X |
| Rear end dragging | X | ○ | ○ | ○ | Δ |
| Difference in SR periodic density | ○ | X | ○ | ○ | Δ |

Image test results are illustrated above in Table 7, where the results were recorded using the symbol "○" to represent "Excellent" results, the symbol "Δ" to represent "Acceptable" results, and the symbol "×" to represent "Poor" results. In Comparative Example 4, current leaked due to the supply roller having a very low resistance, so an inferior toner charge property evaluation result was exhibited. Additionally, having an inferior toner charge property and a poor toner supply property caused poor evaluation results in the toner supply property and the rear end dragging test. The supply roller manufactured in Comparative Example 5 exhibited a poor difference in SR periodic density evaluation result due to insufficient elasticity. In Comparative Example 6, the high resistance caused toner supply property evaluation result to be reduced. In contrast, both the toner supply rollers manufactured in accordance with methods of the general inventive concept in Examples 3 and 4 exhibited excellent evaluation results.

A conductive polyurethane foam toner supply roller manufactured using a method according to the present general inventive concept described above may have a low or medium resistance. The conductive toner supply roller may be used in an electrostatic recording apparatus, such as a printer, a facsimile machine, a copier or the like.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of manufacturing a conductive toner supply roller, the method comprising:
preparing a polyurethane foam;
impregnating the polyurethane foam with an impregnation solution including an electroconductive polymer, a binder resin, an electroconductive agent, and a solvent, and without a charge controlling agent, and drying the resulting polyurethane foam;
cutting the dried polyurethane foam, and inserting a shaft into the cut polyurethane foam; and
polishing an outer surface of the resulting polyurethane foam,
wherein the electroconductive polymer of the impregnation solution is added in an amount in the range of approximately 0.3 phr to approximately 10 phr based on an amount of the impregnation solution,
the electroconductive agent is a compound selected from a group consisting of conductive carbon blacks, oxidation-treated carbon ink, thermal carbon, natural graphite, artificial graphite, and conductive metallic oxides and metals, and
the electroconductive polymer of the impregnation solution includes at least a polythiophene and, where selected, further includes at least one of electroconductive polymers selected from a group consisting of poly (p-phenylene), poly (ethylenedioxythiophene), polypyrrole, poly (p-phenylenevinylene), poly (thienylvinylene), polyaniline, polyisothianaphthen and poly (p-phenylenesulfide).

2. The method of claim 1, wherein the polyurethane foam is prepared by mixing a compound having at least two active hydrogen atoms and a compound having at least two isocyanate groups in the presence of a catalyst, a blowing agent and a surfactant, and by foaming the mixture.

3. The method of claim 2, wherein the compound having at least two active hydrogen atoms is selected from a group consisting of a polyether polyol, a polyester polyol, and a polyetherester polyol having a terminal hydroxyl group on its end, an acryl-modified polyol, and a silicone-modified polyol.

4. The method of claim 2, wherein the compound having at least two isocyanate groups comprises polyisocyanate.

5. The method of claim 2, wherein the catalyst comprises a tertiary amine.

6. The method of claim 2, wherein the blowing agent comprises water.

7. The method of claim 2, wherein the surfactant comprises a silicone surfactant.

8. The method of claim 2, wherein the polyurethane foam is prepared in the additional presence of a reactive conducting agent.

9. The method of claim 2, wherein the compound having at least two isocyanate groups comprises toluene diisocyanate (TDI).

10. The method of claim 2, wherein the compound having at least two isocyanate groups comprises 4,4-diphenylmethane diisocyanate (MDI).

11. The method of claim 2, wherein the blowing agent comprises trichlorofluoromethane.

12. The method of claim 1, wherein the binder resin is at least one compound selected from a group consisting of an acrylic resin, a polyacrylic acid ester resin, an acrylic acid-styrene copolymer, a polyvinyl alcohol, a polyacrylamide, a polyvinylchloride resin, a polyurethane resin, a vinyl acetate resin, a butadiene resin, an epoxy resin, an alkyd resin, a melamine resin and a chloroprene resin, and is added in an amount in a range of from approximately 5 to approximately 30 phr based on an amount of the impregnation solution.

13. The method of claim 1, wherein the binder resin comprises an acrylic resin.

14. The method of claim 1, wherein the electroconductive agent is added in an amount in a range of from approximately 3 to approximately 20 phr based on an amount of the impregnation solution.

15. The method of claim 1, wherein the electroconductive agent comprises a conductive carbon black.

16. The method of claim 1, wherein the solvent comprises water.

17. The method of claim 1, wherein the solvent comprises alcohol.

18. A conductive toner supply roller manufactured by impregnating a polyurethane foam with an impregnation solution including an electroconductive polymer, a binder resin, an electroconductive agent and a solvent and without a charge controlling agent, and drying the polyurethane foam,
wherein the electroconductive polymer of the impregnation solution is included in an amount in the range of approximately 0.3 phr to approximately 10 phr based on an amount of the impregnation solution,
the electroconductive agent is a compound selected from a group consisting of conductive carbon blacks, oxidation-treated carbon ink, thermal carbon, natural graphite, artificial graphite, and conductive metallic oxides and metals, and
the electroconductive polymer of the impregnation solution includes at least a polythiophene and, where selected, further includes at least one of electroconductive polymers selected from a group consisting of poly (p-phenylene), poly(ethylenedioxythiophene), polypyrrole, poly(p-phenylenevinylene), poly (thienylvinylene), polyaniline, polyisothianaphthen and poly(p-phenylenesulfide)

wherein the polyurethane foam has a resistance of from approximately 1.0E+05 to approximately 9.0E+07 and a hardness of from approximately 40 to approximately 80 (ASKER F type).

19. An electrostatic recording apparatus comprising:

a conductive toner supply roller manufactured by impregnating a polyurethane foam with an impregnation solution including an electroconductive polymer, a binder resin, an electroconductive agent and a solvent and without a charge controlling agent, and drying the polyurethane foam, wherein the electroconductive polymer of the impregnation solution is included in an amount in the range of approximately 0.3 phr to approximately 10 phr based on an amount of the impregnation solution, the electroconductive agent is a compound selected from a group consisting of conductive carbon blacks, oxidation-treated carbon ink, thermal carbon, natural graphite, artificial graphite, and conductive metallic oxides and metals, and the electroconductive polymer of the impregnation solution includes at least a polythiophene and, where selected, further includes at least one of electroconductive polymers selected from a group consisting of poly(p-phenylene), poly(ethylenedioxythiophene), polypyrrole, poly(p-phenylenevinylene), poly(thienylvinylene), polyaniline, polyisothianaphthen and poly(p-phenylenesulfide)

wherein the polyurethane foam has a resistance of from approximately 1.0E+05 to approximately 9.0E+07 and a hardness of from approximately 40 to approximately 80 (ASKER F type).

20. An electroconductive toner supply roller of an image forming device manufactured by a method, comprising:

preparing a polyurethane foam by mixing a compound having at least two active hydrogen atoms and a compound having at least two isocyanate groups in the presence of a catalyst, a blowing agent and a surfactant to form a mixture, and by foaming the mixture;

impregnating the prepared polyurethane foam with an impregnation solution including an electroconductive polymer, a binder resin, an electroconductive agent and a solvent and without a charge controlling agent;

wherein the electroconductive polymer of the impregnation solution is included in an amount in the range of approximately 0.3 phr to approximately 10 phr based on an amount of the impregnation solution, the electroconductive agent is a compound selected from a group consisting of conductive carbon blacks, oxidation-treated carbon ink, thermal carbon, natural graphite, artificial graphite, and conductive metallic oxides and metals, and the electroconductive polymer of the impregnation solution includes at least a polythiophene and, where selected, further includes at least one of electroconductive polymers selected from a group consisting of poly(p-phenylene), poly(ethylenedioxythiophene), polypyrrole, poly(p-phenylenevinylene), poly(thienylvinylene), polyaniline, polyisothianaphthen and poly(p-phenylenesulfide)

drying and pressing the impregnated polyurethane foam; and inserting a shaft into the dried and pressed polyurethane foam.

21. The electroconductive toner supply roller of claim 20, wherein the compound having at least two isocyanate groups consists of polyisocyanate.

\* \* \* \* \*